US011572435B2

(12) United States Patent
Lindner

(10) Patent No.: US 11,572,435 B2
(45) Date of Patent: Feb. 7, 2023

(54) METHOD FOR REDUCING THE ALDEHYDE EMISSIONS OF POLYURETHANE FOAMS

(71) Applicant: Covestro Deutschland AG, Leverkusen (DE)

(72) Inventor: Stefan Lindner, Remscheid (DE)

(73) Assignee: Covestro Deutschland AG, Leverkusen (DE)

( * ) Notice: Subject to any disclaimer, the term of this patent is extended or adjusted under 35 U.S.C. 154(b) by 633 days.

(21) Appl. No.: 16/330,596

(22) PCT Filed: Sep. 12, 2017

(86) PCT No.: PCT/EP2017/072870
§ 371 (c)(1),
(2) Date: Mar. 5, 2019

(87) PCT Pub. No.: WO2018/050628
PCT Pub. Date: Mar. 22, 2018

(65) Prior Publication Data
US 2021/0292467 A1 Sep. 23, 2021

(30) Foreign Application Priority Data

Sep. 13, 2016 (EP) .................... 16188519

(51) Int. Cl.
C08G 18/76 (2006.01)
C08G 18/48 (2006.01)
C08J 9/12 (2006.01)
C08K 5/134 (2006.01)

(52) U.S. Cl.
CPC ..... *C08G 18/7671* (2013.01); *C08G 18/4812* (2013.01); *C08G 18/4841* (2013.01); *C08J 9/125* (2013.01); *C08K 5/1345* (2013.01); *C08G 2110/0083* (2021.01); *C08J 2203/10* (2013.01); *C08J 2375/08* (2013.01); *C08K 2201/019* (2013.01)

(58) Field of Classification Search
CPC ............ C08G 18/4812; C08G 18/4833; C08G 18/4841; C08G 18/7664; C08G 18/7671; C08G 2110/0083; C08J 9/125; C08J 2203/10; C08J 2375/08; C08K 5/1345; C08K 2201/019
See application file for complete search history.

(56) References Cited

U.S. PATENT DOCUMENTS

| 3,580,890 | A | 5/1971 | Diehr et al. |
| 3,620,986 | A | 11/1971 | Diehr et al. |
| 3,772,218 | A | 11/1973 | Lamplugh et al. |
| 4,070,304 | A | 1/1978 | Hinze |
| 4,089,835 | A | 5/1978 | König et al. |
| 4,248,930 | A | 2/1981 | Haas et al. |
| 4,260,530 | A | 4/1981 | Reischl et al. |
| 4,263,408 | A | 4/1981 | Meyborg et al. |
| 4,374,209 | A | 2/1983 | Rowlands |
| 4,925,888 | A | 5/1990 | Aumueller et al. |
| 5,556,894 | A * | 9/1996 | Fishback ............ C08G 18/3878 252/182.28 |
| 5,695,689 | A | 12/1997 | Gupta et al. |
| 5,824,738 | A * | 10/1998 | Humphrey ............ C08K 5/005 524/715 |
| 5,869,565 | A * | 2/1999 | Clauss .................. C08K 5/005 524/109 |
| 6,348,514 | B1 | 2/2002 | Calabrese et al. |
| 7,879,928 | B2 | 2/2011 | Goh et al. |
| 2004/0143028 | A1 | 7/2004 | Takano et al. |
| 2009/0082482 | A1* | 3/2009 | Schilling .................. C08J 9/141 521/172 |
| 2011/0230581 | A1 | 9/2011 | Klescewski et al. |
| 2012/0271026 | A1 | 10/2012 | Barman et al. |
| 2013/0030068 | A1* | 1/2013 | Sasaki ................ C08G 18/4837 521/126 |
| 2013/0203880 | A1 | 8/2013 | Emmanuel et al. |
| 2016/0024268 | A1* | 1/2016 | Nishiguchi ......... C08G 18/1808 521/176 |
| 2016/0369035 | A1* | 12/2016 | Burdeniuc ................. C08J 9/12 |

FOREIGN PATENT DOCUMENTS

| CN | 104774306 A | 7/2015 |
| DE | 3103757 A1 | 12/1981 |
| EP | 0176013 A2 | 4/1986 |
| GB | 1211405 A | 11/1970 |
| GB | 2072204 A | 9/1981 |
| JP | H11302352 A | 11/1999 |
| JP | 2008115325 A | 5/2008 |

(Continued)

OTHER PUBLICATIONS

Oertel, Gunter; Polyurethane Handbook, 2nd Edition; Hanser Publishing, NY (1993); pp. 98-119 believed to correspond to Kunststoff Handbuch; vol. VII; pp. 104-127; edited by G. Oertel, Carl Hanser-Verlag, Munich, 3rd edition, (1993).
W. Siefken in Justus Liebigs Annalen der Chemie, 562, pp. 75 to 136.
Oertel, Gunter; Polyurethane Handbook, 2nd Edition; Hanser Publishing, NY (1993); pp. 129-245; believed to correspond to Kunststoff Handbuch; vol. VII, pp. 139-265, edited by Vieweg and Hochtlen, Carl-Hanser-Verlag, Munich, (1993).
Al-Rashid et al., "Aldehyde Emissions from Flexible Molded Foam," American Chemistry Council Center for the Polyurethanes Industry (CPI) Technical Conference, Air Products and Chemicals, Inc., 2015, 18 pages.

(Continued)

Primary Examiner — John M Cooney
(74) Attorney, Agent, or Firm — Donald R. Palladino

(57) ABSTRACT

The present invention relates to a process for producing polyurethanes having reduced aldehyde emissions using large amounts of phenolic antioxidants. The present invention further relates to the polyurethanes obtainable from this process, and to the use of such polyurethanes, for example in the interior of automobiles.

12 Claims, No Drawings

(56) References Cited

FOREIGN PATENT DOCUMENTS

JP 4809643 B2 11/2011

OTHER PUBLICATIONS

Botkin, James H., "Scorch Inhibitors for Polyurethane Slabstock Foams," in: Botkin's Advances in Urethane Science and Technology, Florida, CRC Press, 1998, pp. 57-80.
Carpol GP-3000, Technical Data Sheet, Carpenter Co. Chemicals Division, May 2015, 2 pages.
Clauss et al., "Antioxidant Systems for Stabilization of Flexible Polyurethane Slabstock Foams," Journal of Cellular Plastics, Sep. 1997, vol. 33, No. 5, pp. 457-476.
Elastoflex 3595/100, O1a, Production description, 1 page.
Elastoflex 3595/100, O1b1. Production description, 1 page.
Elastoflex 3595/100, O1b2, Production description, 1 page.
Elastoflex 3595/100, O1b3, Technologische Karte zur Herstellung von Lupranol 2095/2097—Linie 10, BASF Schwarzheide GmbH, 2015, 11 pages.
Elastoflex 3595/100, O1c, Invoice, BASF Polyurethanes GmbH, 2015, 1 page.
Elastoflex 3595/100, O1d, Usage for Polyurethane Production, Email Communication, BASF, 2022, 6 pages.
Elastoflex 3595/106, O2a, Product description, 1 page.
Elastoflex 3595/106, O2b1, Technologische Karte zur Herstellung von L 4003/1 (Lupranol 4800N), BASF Schwarzheide GmbH, 2013, 3 pages.
Elastoflex 3595/106, O2c, Invoice, BASF Slovensko spol. s r.o., 2016, 1 page.
Elastoflex 3595/106, O2d, Usage for Polyurethane Production, Email communication, BASF, 2022, 2 pages.
Elastoflex 5635/109, O3a, Production description, 1 page.
Elastoflex 5635/109, O3b1, Technologische Karte zur Herstellung von Lupranol L 1201/1 (VP 9266)—Linie 12, BASF, 2013, 4 pages.
Elastoflex 5635/109, O3b2, Lupranol 1002/1, Technical Data Sheet, BASF, 2 pages.
Elastoflex 5635/109, O3c, Invoice, BASF Slovenski spol. s r. o., 2016, 1 page.
Elastoflex 5635/109, O3d, Usage for Polyurethane Production, Email communication, BASF, 2022, 3 pages.
Fomrez 50, Technical Information, Chemtura, Oct. 2012, 1 page.
Griffiths et al., "The Autoxidation of Polyfpropylene oxide)s," European Polymer Journal, 1993, vol. 29, Issues 2-3, pp. 437-442.
Irganox 1076, Industrial Coatings, Construction, Technical Data Sheet, BASF, Jul. 2019, Rev. 3, 3 pages.
Irganox 1076, Technical Information, BASF, Sep. 2010, 2 pages.
Irganox 245, Technical Information, BASF, Sep. 2010, 2 pages.
Jeffol Polyether Polyols Brochure, Huntsman, 6 pages.
Office Action in EP17768422.2, dated Mar. 11, 2022, 22 pages.
Office Action in EP17768422.2, date Mar. 15, 2022, 45 pages.
Rota et al., "New Antioxidant and Light Stabilizer Systems for PUR Applications," Ciba Specialty Chemicals Inc., UTECH, 2003, 20 pages.
Santowhite BBMC, Product Data, Flexsys, 2000, 2 pages.

\* cited by examiner

METHOD FOR REDUCING THE ALDEHYDE EMISSIONS OF POLYURETHANE FOAMS

CROSS-REFERENCE TO RELATED APPLICATIONS

This application is a national stage application under 35 U.S.C. § 371 of PCT/EP2017/072870, filed Sep. 12, 2017, which claims the benefit of European Application No. 16188519.9, filed on Sep. 13, 2016, both of which are incorporated by reference herein.

FIELD

The present invention relates to a process for producing polyurethanes having reduced aldehyde emissions using large amounts of phenolic antioxidants.

The present invention further relates to the polyurethanes obtainable from this process, and to the use of such polyurethanes, for example in the interior of automobiles.

BACKGROUND

Polyurethanes have a very wide variety of possible applications, for example in the furniture industry as seat cushioning or as a binder for chipboard, as insulation material in the construction industry, as insulation material of for example pipes, hot water tanks or refrigerators and as trim parts, for example in vehicle construction. Polyurethanes are often employed especially in automobile construction, for example in automotive exterior trim as spoilers, roof elements, suspension elements and in automotive interior trim as roof trim, carpet foam backings, door trim, steering wheels, shift knobs and seat cushions.

It is known that materials can result in emissions. Especially closed spaces, for example in the interior of buildings or vehicles, for example automobiles, are particularly affected. One example of such emissions is the emission of aldehydes, in particular of formaldehyde and acetaldehyde. These emissions are verified for example in measurements according to VDA 275 (flask method, 3 h 60° C.) or else according to VDA 276 (emissions chamber test, 65° C.).

The present invention had for its object to provide polyurethanes, in particular polyurethane foams, exhibiting only low aldehyde emission, in particular only low formaldehyde and acetaldehyde emission. The emission values should not exceed 160 µg/m$^3$ (VDA 276). The emission of other substances hazardous to health or the environment, in particular substances detectable in the emissions test according to VDA 278, should also be very largely avoided.

SUMMARY

It has now been found that, surprisingly, the abovementioned technical problem is solved by a production process in which large amounts of phenolic antioxidants are added.

The present invention accordingly provides a process for producing polyurethane foams by reaction of component A containing A1 compounds containing isocyanate-reactive hydrogen atoms having an OH number according to DIN 53240 of ≥15 to <280 mg KOH/g, A2 optionally compounds containing isocyanate-reactive hydrogen atoms having an OH number according to DIN 53240 of ≥280 to <4000 mg KOH/g, A3 water and/or physical blowing agents, A4 optionally auxiliary and additive substances such as
 a) catalysts,
 b) surface-active additive substances,
 c) pigments or flame retardants, A5 one or more phenolic antioxidants other than 2,4-dimethyl-6-ocytylphenol, 2,6-di-t-butyl-4-methylphenol, 2,6-di-t-butyl-4-ethylphenol, 2,6-di-t-butyl-4-n-butylphenol, 2,2'-methylenebis(4-methyl-6-t-butylphenol) and 2,2'-methylenebis(4-ethyl-6-t-butylphenol), with B di- or polyisocyanates, wherein component A5 is employed in amounts of ≥0.07 parts by weight, preferably ≥0.08 parts by weight, particularly preferably ≥0.1 parts by weight, based on 100 parts by weight of the component A1, and wherein component A may contain in addition to the antioxidant A5 up to 0.01 parts by weight (≤0.01 parts by weight), based on 100 parts by weight of the component A1, of antioxidants containing amino groups.

The present invention also provides a process as described hereinabove, wherein
 i) in addition to the antioxidant A5 component A contains no antioxidants containing amino groups, or
 ii) in addition to the antioxidant A5 component A contains no other antioxidants.

The present invention also provides the polyurethane foams obtainable by the described processes.

The use in principle of antioxidants to stabilize the polyol used in polyurethane production and to avoid core discoloration of the polyurethane foam produced is known. Thus U.S. Pat. No. 4,070,304 B describes the use of a combination of phenolic and aminic antioxidants for the latter purpose (column 3, line 47 to 50). U.S. Pat. No. 4,070,304 B does not in any way render obvious the use of large amounts of phenolic antioxidants to reduce aldehyde emission.

The use of aminic antioxidants results in high values in the emission test according to VDA 278. The emission of amines should be avoided or at least kept as low as possible for environmental and health/hygiene reasons.

However, since U.S. Pat. No. 4,070,304 B insists upon precisely this use of aminic antioxidants it teaches away from the subject matter of the present invention.

DETAILED DESCRIPTION

Preferred Embodiments and Description of the Components

The present invention in particular provides a process for producing polyurethane foams by reaction of component A containing A1 75 to 99.5 parts by weight, preferably 89 to 97.7 parts by weight, (based on the sum of the parts by weight of the components A1 to A4) of compounds containing isocyanate-reactive hydrogen atoms having an OH number according to DIN 53240 of ≥15 to <280 mg KOH/g, A2 0 to 10 parts by weight, preferably 0.1 to 2 parts by weight, (based on the sum of the parts by weight of the components A1 to A4) of compounds containing isocyanate-reactive hydrogen atoms having an OH number according to DIN 53240 of ≥280 to <4000 mg KOH/g, A3 0.5 to 25 parts by weight, preferably 2 to 5 parts by weight, (based on the sum of the parts by weight of the components A1 to A4) of water and/or physical blowing agents, A4 0 to 10 parts by weight, preferably 0.2 to 4 parts by weight, (based on the sum of the parts by weight of the components A1 to A4) of auxiliary and additive substances such as
 a) catalysts,
 b) surface-active additive substances,
 c) pigments or flame retardants,
A5≥0.07 parts by weight, preferably ≥0.08 parts by weight, particularly preferably ≥0.1 parts by weight, (based on 100 parts by weight of the component A1) of one or more phenolic antioxidants other than 2,4-dimethyl-6-ocytylphenol, 2,6-di-t-butyl-4-methylphenol, 2,6-di-t-butyl-4-ethylphenol, 2,6-di-t-butyl-4-n-butylphenol, 2,2'-methylenebis(4-methyl-6-t-butylphenol) and 2,2'-methylenebis(4-ethyl-6-t-butylphenol),
with
B di- or polyisocyanates,
wherein component A may contain in addition to the antioxidant A5 up to 0.01 parts by weight (≤0.01 parts by weight), based on 100 parts by weight of the component A1, of antioxidants containing amino groups, and
wherein the production is carried out at an index of 50 to 250, preferably 70 to 130, particularly preferably 75 to 115, and
wherein all reported parts by weight for the components A1 to A4 are in the present application normalized such that the sum of the parts by weight of components A1+A2+A3+A4 in the composition adds up to 100.

The present invention also provides a process as described hereinabove, wherein
 i) in addition to the antioxidant A5 component A contains no antioxidants containing amino groups, or
 ii) in addition to the antioxidant A5 component A contains no other antioxidants.

The invention further provides for the use of phenolic antioxidants other than 2,4-dimethyl-6-octylphenol, 2,6-di-t-butyl-4-methylphenol, 2,6-di-t-butyl-4-ethylphenol, 2,6-di-t-butyl-4-n-butylphenol, 2,2'-methylenebis(4-methyl-6-t-butylphenol) and 2,2'-methylenebis(4-ethyl-6-t-butylphenol) in processes for producing polyurethanes, preferably polyurethane foams, to reduce the aldehyde emission from the resulting polyurethanes/polyurethane foams, characterized in that the phenolic antioxidants are employed in amounts of ≥0.07 parts by weight, preferably ≥0.08 parts by weight, particularly preferably ≥0.1 parts by weight, based on 100 parts by weight of a component used in the production process which is selected from compounds containing isocyanate-reactive hydrogen atoms having an OH number according to DIN 53240 of ≥15 to <280 mg KOH/g, and in addition to the phenolic antioxidants up to 0.01 parts by weight (≤0.01 parts by weight) of antioxidants containing amino groups may be present, likewise based on 100 parts by weight of the component which is selected from compounds containing isocyanate-reactive hydrogen atoms having an OH number according to DIN 53240 of ≥15 to <280 mg KOH/g.

The present invention also provides for the use as described hereinabove, wherein
 i) in addition to the phenolic antioxidants no antioxidants containing amino groups are present, or
 ii) in addition to the phenolic antioxidants no other antioxidants are present.

The production of isocyanate-based foams is known per se and described for example in DE-A 1 694 142, DE-A 1 694 215 and DE-A 1 720 768 and also in Kunststoff-Handbuch volume VII, Polyurethanes, edited by Vieweg and Hochtlein, Carl Hanser Verlag, Munich 1966, and in the new edition of this book, edited by G. Oertel, Carl Hanser Verlag Munich, Vienna 1993.

Concerned here are predominantly foams containing urethane and/or uretdione and/or urea and/or carbodiimide groups. The use according to the invention is preferably carried out in the production of polyurethane and polyisocyanurate foams.

The moldings preferably have a density between 15 and 120 kg/m$^3$, particularly preferably between 30 and 90 kg/m$^3$.

The production of the isocyanate-based foams may employ the components more particularly described hereinbelow.

Component A1

Starting components according to component A1 are compounds having at least two isocyanate-reactive hydrogen atoms having an OH number according to DIN 53240 of ≥15 to <280 mg KOH/g.

This is to be understood as meaning not only amino-containing but also thiol-containing or carboxyl-containing compounds, preferably hydroxyl-containing compounds, in particular compounds containing 2 to 8 hydroxyl groups, specifically those having an OH number according to DIN 53240 of ≥20 to ≤150 mg KOH/g, preferably ≥20 to ≤50 mg KOH/g, very particularly preferably ≥25 to ≤40 mg KOH/g, for example polyethers and polyesters and also polycarbonates and polyesteramides containing at least 2, generally 2 to 8, but preferably 2 to 6, hydroxyl groups, such as are known per se for the production of homogeneous and of cellular polyurethanes and as are described for example in EP-A 0 007 502, pages 8-15. The polyethers containing at least two hydroxyl groups are preferred in accordance with the invention.

Also employable in component A1 as hydroxyl-containing compounds are polymer polyols, PUD polyols and PIPA polyols. Polymer polyols are polyols containing proportions of solid polymers produced by free-radical polymerization of suitable monomers such as styrene or acrylonitrile in a base polyol. PUD (polyureadispersion) polyols are produced for example by in-situ polymerization of an isocyanate or an isocyanate mixture with a diamine and/or hydrazine in a polyol, preferably a polyether polyol. The PUD dispersion is preferably produced by reaction of an isocyanate mixture composed of 75% to 85% by weight of 2,4-tolylene diisocyanate (2,4-TDI) and from 15 to 25% by weight of 2,6-tolylene diisocyanate (2,6-TDI) with a diamine and/or hydrazine in a polyether polyol, preferably a polyether polyol, produced by alkoxylation of a trifunctional starter (for example glycerol and/or trimethylolpropane). Processes for producing PUD dispersions are described for example in U.S. Pat. Nos. 4,089,835 and 4,260,530. PIPA polyols are polyether polyols modified with alkanolamines by polyisocyanate-polyaddition, wherein the polyether polyol has a functionality of from 2.5 to 4 and a hydroxyl number of from ≥3 mg KOH/g to ≤112 mg KOH/g (molecular weight from 500 to 18 000). PIPA polyols are described extensively in GB 2 072 204 A, DE 31 03 757 A1 and U.S. Pat. No. 4,374,209 A.

For production of polyurethane foams in the cold-cure process it is preferable when at least two hydroxyl-containing polyethers having an OH number according to DIN 53240 of >20 to <50 mg KOH/g are employed, wherein the OH groups are composed to an extent of >80 mol % of primary OH groups (determination by $^1$H-NMR (e.g. Bruker DPX 400, deuterochloroform)). It is particularly preferable when the OH number is >25 to <40 mg KOH/g, very particularly preferably >25 to <35 mg KOH/g.

Component A2

Optionally employed as component A2 are compounds having at least two isocyanate-reactive hydrogen atoms and an OH number according to DIN 53240 of ≥280 to <4000 mg KOH/g, preferably ≥400 to ≤3000 mg KOH/g, particularly preferably ≥1000 to ≤2000 mg KOH/g. This is to be understood as meaning hydroxyl-containing and/or amino-containing and/or thiol-containing and/or carboxyl-containing compounds, preferably hydroxyl-containing and/or amino-containing compounds, which serve as chain extenders or crosslinkers. These compounds generally have 2 to 8, preferably 2 to 4, isocyanate-reactive hydrogen atoms. Employable as component A2 are for example ethanolamine, diethanolamine, triethanolamine, sorbitol and/or glycerol. Further examples of compounds according to component A2 are described in EP-A 0 007 502, pages 16-17.

Component A3

As component A3 water and/or physical blowing agents are employed. Employed as physical blowing agents are, for example, carbon dioxide and/or volatile organic substances as blowing agents.

Component A4

Optionally used as component A4 are auxiliary and additive substances such as
a) catalysts (activators),
b) surface-active added substances (surfactants), such as emulsifiers and foam stabilizers, in particular those having low emissions, for example products of the Tegostab® LF2 series,
c) additives such as reaction retardants (for example acidic substances such as hydrochloric acid or organic acyl halides), cell regulators (for example paraffins or fatty alcohols or dimethylpolysiloxanes), pigments, dyes, flame retardants (for example TCPP), stabilizers against aging and weathering effects, plasticizers, fungistatic and bacteriostatic substances, fillers (for example barium sulfate, kieselguhr, carbon black or whiting) and release agents.

These auxiliaries and additives which may be concomitantly used are, for example, described in EP-A 0 000 389, pages 18-21. Further examples of auxiliary and additive substances for optional concomitant use according to the invention and also details concerning ways these auxiliary and additive substances are used and function are described in Kunststoff-Handbuch, volume VII, edited by G. Oertel, Carl-Hanser-Verlag, Munich, 3rd edition, 1993, for example on pages 104-127.

Employable catalysts are for example aliphatic tertiary amines (for example triethylamine, tetramethylbutanediamine), cycloaliphatic tertiary amines (for example 1,4-diaza[2.2.2]bicyclooctane, aliphatic amino ethers (for example dimethylaminoethyl ether and N,N,N-trimethyl-N-hydroxyethylbisaminoethyl ether), cycloaliphatic amino ethers (for example N-ethylmorpholine), aliphatic amidines, cycloaliphatic amidines, urea, derivatives of urea (for example aminoalkylureas; see, for example, EP-A 0 176 013, especially (3-dimethylaminopropylamine)urea), and tin catalysts (for example dibutyltin oxide, dibutyltin dilaurate, tin octoate).

Preferred catalysts are
α) urea, derivatives of urea and/or
β) amines and aminoethers which each contain a functional group that undergoes a chemical reaction with the isocyanate. The functional group is preferably a hydroxyl group, a primary or secondary amino group. These particularly preferred catalysts have the advantage that they exhibit strongly reduced migration and emission characteristics.

Examples of particularly preferred catalysts include: (3-dimethylaminopropylamine)urea, 2-(2-dimethylaminoethoxy)ethanol, N,N-bis(3-dimethylaminopropyl)-N-isopropanolamine, N,N,N-trimethyl-N-hydroxyethylbisaminoethyl ether and 3-dimethylaminopropylamine.

It is preferable when no tin catalysts are employed.

Component A5

According to the invention component A5 comprises a phenolic antioxidant.

Phenolic antioxidants include for example tetrakis[methylene(3,5-di-t-butyl-4-hydroxyhydrocinnamate)]methane, N,N'-1,6-hexamethylene-bis-3-(3,5-di-t-butyl-4-hydroxyphenyl)propionamide, alkyl-3-(3,5-di-t-butyl-4-hydroxyphenylpropionate), wherein alkyl comprises a carbonaceous radical having ≥1 carbon atom, preferably ≥6 carbon atoms, particularly preferably ≥8 carbon atoms, very particularly preferably ≥9 carbon atoms (for example octadecyl-3-(3,5-di-t-butyl-4-hydroxyphenylpropionate)), ethylene(bisoxyethylene)bis(3,5-t-butylhydroxy-4-tolyl)propionate, 4,4'-butylidenebis(6-t-butyl-3-methylphenol) and/or tocopherols such as for example α-tocopherol, β-tocopherol, γ-tocopherol, δ-tocopherol and mixtures thereof (Vitamin E).

Preferably employed as component A5 are compounds having a molecular weight of ≥380 g/mol, particularly preferably ≥400 g/mol, very particularly preferably ≥500 g/mol. Preferably employed as component A5 are compounds having ≥25 carbon atoms, particularly preferably ≥26 carbon atoms, very particularly preferably ≥30 carbon atoms.

The usage amount of the component A5 according to the invention based on 100 parts by weight of the component A1 is ≥0.07 parts by weight, preferably ≥0.08 parts by weight, particularly preferably ≥0.1 parts by weight. The maximum usage amount of the component A5 is preferably ≤0.4, particularly preferably ≤0.3 and very particularly preferably 0.25 parts by weight, based on 100 parts by weight of the component A1.

In one particular embodiment component A contains in addition to the antioxidant A5>0.05 to ≤4.0, preferably >0.1 to ≤1.0, particularly preferably >0.2 to ≤0.4, parts by weight of trisdipropylene glycol phosphite based on 100 parts by weight of component A1.

Component B

Employed as component B are aliphatic, cycloaliphatic, araliphatic, aromatic and heterocyclic polyisocyanates, such as are described for example by W. Siefken in Justus Liebigs Annalen der Chemie, 562, pages 75 to 136, for example those of formula (V)

$$Q(NCO)_n \quad (V)$$

in which
n=2-4, preferably 2-3,
and
Q is an aliphatic hydrocarbon radical having 2-18, preferably 6-10, carbon atoms, a cycloaliphatic hydrocarbon radical having 4-15, preferably 6-13, carbon atoms or an araliphatic hydrocarbon radical having 8-15, preferably 8-13, carbon atoms.

Concerned here are, for example, polyisocyanates such as are described in EP-A 0 007 502, pages 7-8. Particular preference is generally given to the readily industrially obtainable polyisocyanates, for example 2,4- and 2,6-tolylene diisocyanate and any desired mixtures of these isomers ("TDI"); polyphenylpolymethylene polyisocyanates such as are prepared by aniline-formaldehyde condensation and subsequent phosgenation ("crude MDI"), and polyisocyanates comprising carbodiimide groups, urethane groups, allophanate groups, isocyanurate groups, urea groups or biuret groups ("modified polyisocyanates" or "prepolymers"), in particular modified polyisocyanates which derive from 2,4- and/or 2,6-tolylene diisocyanate or from 4,4'- and/or 2,4'- and/or 2,2'-diphenylmethane diisocyanate. Preferably employed as component B is at least one compound selected from the group consisting of tolylene 2,4- and 2,6-diisocyanate, diphenylmethane 4,4'- and 2,4'- and 2,2'-diisocyanate and polyphenylpolymethylene polyisocyanate ("polycyclic MDI"), particularly preferably at least one compound selected from the group consisting of diphenylmethane 4,4'- and 2,4'- and 2,2'-diisocyanate and polyphenylpolymethylene polyisocyanate ("polycyclic MDI").

The mixtures of diphenylmethane diisocyanate and polyphenylenepolymethylene polyisocyanate (pMDI) have a preferred monomer content between 50% and 100% by weight, preferably between 60% and 95% by weight, particularly preferably between 75% and 90% by weight. The NCO content of the polyisocyanate used should preferably exceed 25% by weight, preferably 30% by weight, particularly preferably 31.4% by weight. The employed MDI should preferably have a content of 2,4'-diphenylmethane diisocyanate of at least 3% by weight, preferably at least 15% by weight.

Performance of the Process for Producing Polyurethane Foams:

The reaction components are reacted by the one-step process known per se, the prepolymer process or the semiprepolymer process often using mechanical means, for example those described in EP-A 355 000. Details of processing apparatuses which are also suitable in accordance with the invention are described in Kunststoff-Handbuch, volume VII, edited by Vieweg and Hochtlen, Carl-Hanser-Verlag, Munich 1993, for example on pages 139 to 265.

The PUR foams may be produced as molded foams or else as slabstock foams. It is preferable when they are produced as molded foams.

The molded foams may be produced in the hot- or cold-cure process, preference being given to the cold-cure process.

The invention therefore relates to a process for producing the polyurethane foams, to the polyurethane foams produced by this process, to the use of said foams for producing moldings and to the moldings themselves.

The polyurethane foams obtainable according to the invention find use for example in furniture cushioning, textile padding, mattresses, automobile seats, headrests, armrests, sponges and building elements and also seat and dashboard trim and have indices of 50 to 250, preferably 70 to 130, particularly preferably 75 to 115.

The index (isocyanate index) indicates the percentage ratio of the actually employed isocyanate amount to the stoichiometric, i.e. calculated, isocyanate groups (NCO) amount:

$$\text{Index} = [(\text{employed isocyanate amount}){:}(\text{calculated isocyanate amount})]\cdot 100 \qquad (VI)$$

Examples

Production of Flexible Molded Polyurethane Foams

The input materials recited in the examples of the table which follows are reacted with one another in the one-stage process in the manner of processing customary for the production of flexible moulded polyurethane foams in the cold-cure process. The reaction mixture is introduced into a metal mold that has been heated to 60° C. and coated previously with a release agent (PURA E1429H NV (ChemTrend)) and the mold is then closed. The usage amount is employed according to the desired apparent density and mold volume. A 9.7 liter mold was used. The density of the moldings is 50 kg/m$^3$. The moldings were demolded and wrung-out after 4 minutes. After 4 hours the moldings were sealed in aluminum composite film and then sent for emission testing.

Input Materials:

Polyol A: Glycerol-started polyol having an OH number according to DIN 53240 of 27 mg KOH/g. Using KOH as catalyst glycerol was initially propoxylated (85%) and then ethoxylated (15%). The product contains 85 mol % of primary OH groups (determined using $^1$H-NMR (Bruker DPX 400, deuterochloroform)).

Polyol B: EO-rich polyol: Desmophen 41WB01; product of Covestro

Tegostab B8715LF2: Product of Evonik

Irganox 1076: product of BASF; octadecyl 3-(3,5-di-tert-butyl-4-hydroxyphenyl)propionate CAS number 2082-79-3. Chemical characterization: trisdipropylene glycol phosphite Niax color stabilizer CS-22LF: product of Momentive. Chemical characterization: trisdipropylene glycol phosphite Jeffcat ZR50: product of Huntsman Dabco NE 300: product of Air Products MDI: Mixture of diphenylmethane diisocyanate and polyphenylenepolymethylene polyisocyanate (pMDI) having a monomeric diphenylmethane diisocyanate content of about 82% by weight. The 2,4'-diphenylmethane diisocyanate content is about 19% by weight. The NCO content is 32.6% by weight.

Test Specification

VDA 276: Determining organic emissions from components of the motor vehicle interior in a 1 m$^3$ test chamber, test standard of German Automotive Industry Association (VDA).

Conditioning phase 1.

Results:

|  | Comparative 1 | 2 | 3 | 4 | 5 |
|---|---|---|---|---|---|
| Polyol A | 98.0 | 98.0 | 98.0 | 98.0 | 98.0 |
| Polyol B | 2.0 | 2.0 | 2.0 | 2.0 | 2.0 |
| water (added) | 3.5 | 3.5 | 3.5 | 3.5 | 3.5 |
| Diethanolamine | 1.2 | 1.2 | 1.2 | 1.2 | 1.2 |
| Tegostan B8715LF2 | 1.0 | 1.0 | 1.0 | 1.0 | 1.0 |
| Irganox 1076 | 0.04 | 0.12 | 0.20 | 0.12 | 0.12 |
| Niax_CS-22LF, color stabilizer |  |  |  | 0.1 | 0.3 |
| Jeffcat ZR50 | 0.4 | 0.4 | 0.4 | 0.4 | 0.4 |
| Dabco NE300 | 0.1 | 0.1 | 0.1 | 0.1 | 0.1 |

-continued

|  | Comparative 1 | 2 | 3 | 4 | 5 |
|---|---|---|---|---|---|
| Isocyanate | | | | | |
| MDI | 61.3 | 61.3 | 61.3 | 61.3 | 61.3 |
| Index (100 NCO/OH) | 100 | 100 | 100 | 100 | 100 |
| Result VDA 276-1 | | | | | |
| Formaldehyde [µg/kg] | 179 | 156 | 136 | 77 | 41 |
| Acetaldehyde [µg/kg] | 23 | 18 | 14 | 20 | 27 |
| Acrolein [µg/kg] | 23 | 19 | 18 | 10 | 3 |
| Propionaldehyde [µg/kg] | 36 | 36 | 32 | 40 | 41 |

The invention claimed is:

1. A process for producing polyurethane foams by reacting component A containing
   (1) compounds containing isocyanate-reactive hydrogen atoms, with the proviso that the compounds containing isocyanate-reactive hydrogen atoms consist of:
   A1 compounds containing at least two isocyanate-reactive hydrogen atoms and having an OH number according to DIN 53240 of ≥15 to <280 mg KOH/g, and
   A2 optionally, compounds containing at least two isocyanate-reactive hydrogen atoms and having an OH number according to DIN 53240 of ≥280 to <4000 mg KOH/g,
   (2) water and/or physical blowing agents,
   (3) optionally auxiliary and additive substances, and
   (4) one or more phenolic antioxidants comprising octadecyl-3-(3,5-di-t-butyl-4-hydroxyphenylpropionate, ethylene(bisoxyethylene)bis(3,5-t-butylhydroxy-4-tolyl)propionate, 4,4'-butylidenebis(6-t-butyl-3-methylphenol), or a mixture thereof,
   with
   B diphenylmethane 4,4'-diisocyanate, diphenylmethane 2,4'-diisocyanate, diphenylmethane 2,2'-diisocyanate, polyphenylpolymethylene polyisocyanate, or a mixture thereof,
   wherein component (4) is employed in amounts of ≥0.07 parts by weight based on 100 parts by weight of the component A1,
   and
   with the proviso that component A does not include an alkyl-3-(3,5-di-t-butyl-4-hydroxyphenylpropionate) in which the alkyl comprises a carbonaceous radical having 1 carbon atom.

2. The process as claimed in claim 1, with the proviso that component A does not contain antioxidants containing amino groups.

3. The process as claimed in claim 1, with the proviso that component A does not contain other antioxidants.

4. The process as claimed in claim 2, wherein:
   component A1 is present in an amount of 75 to 99.5 parts by weight, based on the sum of the parts by weight of the components A1, A2, (2) and (3),
   component A2 is present in an amount of 0 to 10 parts by weight, based on the sum of the parts by weight of the components A1, A2, (2) and (3),
   component (2) is present in an amount of 0.5 to 25 parts by weight, based on the sum of the parts by weight of the components A1, A2, (2) and (3), and
   component (3) is present in an amount of 0 to 10 parts by weight, based on the sum of the parts by weight of the components A1, A2, (2) and (3),
   wherein the reaction is carried out at an index of 50 to 250, and
   wherein all reported parts by weight are normalized such that the sum of the parts by weight of components A1+A2+(2)+(3) in the composition adds up to 100.

5. The process as claimed in claim 2, wherein component (4) is employed in amounts of ≥0.08 parts by weight, based on 100 parts by weight of the component A1.

6. The process as claimed in claim 2, wherein component A contains, in addition to the antioxidant (4) >0.05 to ≤4.0 parts by weight of trisdipropylene glycol phosphite, based on 100 parts by weight of component A1.

7. The process as claimed in claim 2, wherein component A comprises <0.01 parts by weight, based on 100 parts by weight of the component A1, of antioxidants containing amino groups.

8. The process as claimed in claim 2, wherein component A1 has an OH number according to DIN 53240 of >25 to <280 mg KOH/g.

9. The process as claimed in claim 2, wherein component B has a monomer content of 50% to 100% by weight.

10. The process as claimed in claim 9, wherein component B comprises a mixture of diphenylmethane diisocyanate and polyphenylpolymethylene polyisocyanate having a monomer content of 60% to 95% by weight.

11. The process as claimed in claim 2, wherein component B has a content of 2,4'-diphenylmethane diisocyanate of at least 3% by weight.

12. The process as claimed in claim 11, wherein component B has a content of 2,4'-diphenylmethane diisocyanate of at least 15% by weight.

* * * * *